United States Patent
Taleyarkhan

(10) Patent No.: US 12,398,445 B2
(45) Date of Patent: Aug. 26, 2025

(54) BACKGROUND RN-REJECTED ACTINIDE IN AIR SPECTROSCOPY

(71) Applicant: Purdue Research Foundation, West Lafayette, IN (US)

(72) Inventor: Rusi P. Taleyarkhan, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 411 days.

(21) Appl. No.: 18/099,307

(22) Filed: Jan. 20, 2023

(65) Prior Publication Data

US 2023/0227943 A1 Jul. 20, 2023

Related U.S. Application Data

(60) Provisional application No. 63/301,125, filed on Jan. 20, 2022.

(51) Int. Cl.
C22B 60/00 (2006.01)
C22B 7/00 (2006.01)

(52) U.S. Cl.
CPC .............. *C22B 60/00* (2013.01); *C22B 7/006* (2013.01)

(58) Field of Classification Search
CPC ....... C22B 60/00; C22B 7/006; C22B 3/3846; C22B 60/0295; C22B 60/04; C22B 60/026
See application file for complete search history.

(56) References Cited

U.S. PATENT DOCUMENTS 9,534,277 B1 * 1/2017 Moreno Bermudez ..................... G21G 1/001

OTHER PUBLICATIONS

Taleyarkhan, R. P. et al., "Tensioned metastable fluid detectors and nanoscale interactions with external stimuli—theoretical-cum-experimental assessments and nuclear engineering applications," Nucl. Engr. Design, vol. 238 (2008), pp. 1820-1827.
Taleyarkhan, R. P. et al., "Real-time monitoring of actinides in chemical nuclear fuel reprocessing plants," Chemical Engr. Research and Design, vol. 91, (2013), pp. 688-702.
Archambault, B. et al., "Large-array special nuclear material sensing with tensioned metastable fluid detectors," IEEE Sensors Journal, Special Issue, vol. 18, No. 19, Oct. 1, 2018, pp. 7868-7874. http://dx.doi.org/10.1109/JSEN.2018.2845344.
Grimes, T. et al., "Fast neutron spectroscopy with tensioned metastable detectors," Nucl. Instr. and Methods in Physics Research, A vol. 830, (2016), pp. 355-365.

(Continued)

*Primary Examiner* — Jessee R Roe
(74) *Attorney, Agent, or Firm* — Purdue Research Foundation

(57) ABSTRACT

The method of separating an actinide within a mixture of an Rn-progeny alpha emitting isotope includes disposing a continuous air monitoring filter in acetone. The acetone is then evaporated, thereby forming a residue. The residue is mixed with a first solution including nitric acid, thus forming a first blend. The first blend is mixed with a second solution including an extraction solvent, thus forming a second blend. The second blend is stratified into a first layer and a second layer. The first layer is extracted from the second blend, thus separating the actinide from the Rn-progeny alpha emitting isotope.

14 Claims, 8 Drawing Sheets

(56) References Cited

OTHER PUBLICATIONS

Gallier, S., "Purdue collaboration yields promising neutron dosimeter," Nuclear News, Jun. 2019, pp. 29-33.
Boyle, N. et al., "Radon and progeny detection using tensioned metastable fluid detectors," Health Physics, Oct. 2019, pp. 434-442.
Taleyarkhan, R. P., "Monitoring neutron radiation in extreme gamma/x-ray radiation fields," Sensors (2020), vol. 20, 640; doi: 10.3390/s20030640, 11 pages. www.mdpi.com/journal/sensors.
Taleyarkhan, R. P. et al., "Neutron spectroscopy & H*10 dosimetry with tensioned metastable fluid detectors," Nucl. Instr. & Meth. In Phys.Res., vol. A 959, (2020), No. 163278, 17 pages.
Hemesath, M., B. et al., "Tensioned Metastable Detectors for Spectrometric Radon-Progeny Detection and AARST-NRPP Standard Qualification," Journal of Nuclear Engineering and Radiation Science, Oct. 2020, vol. 6 / 042001-1-to-8.
Hemesath, M. P., "Development of the Centrifugally Tensioned Metastable Fluid Detector for In-Air Radon and Actinide Alpha Detection," Master of Science Thesis, Purdue University, West Lafayette, IN, USA. May 2020.
American Association of Radon Scientists and Technicians-National Radon Proficiency Program, Proceedings from the 2014 International Radon Symposium, Device Evaluation Program, (2014).
United States Nuclear Regulatory Commission (NRC), 2017.10 CFR 20.1003 Radionuclides; Mar. 24, 2021. https://www.nrc.gov/reading-rm/doc-collections/cfr/part020/appb/.
L'Annunziata, M.F. et al., "Handbook of Radioactivity Analysis," (2012), 3rd Ed., Chapter 11, Elsevier.
Miron Technologies, Inc., Alpha Sentry Detection Head TM (n.d.), (2020); available at https://www.mirion.com/products/alpha-sentry-detection-head-cam-system.
Pomme, S. et al., "Improved peak shape fitting in alpha spectra," Applied Radiation and Isotopes, vol. 96, (2015), p. 148-153; available online Nov. 28, 2014.
Doto, P. C. et al., "Solvent extraction process for recovery of americium-241 at Hanford," Transplutonium Elements—Production and Recovery, Las Vegas, Nev., USA, Aug. 27-28, 1980; American Chemical Society Symposium Series, vol. 161, Chapter 7, (1981), pp. 109-129.
Phillips, P., "Syringe accuracy (TOGC) estimates for ISO 7886-1 1,5 &10 mL" Surgical Materials Testing Laboratory. http://stayconnected.org/wp- content/uploads/2016/08/Calculating-ISO-7886-TOGC-1-5-1 0ml.pdf; (2016).

* cited by examiner

BACKGROUND RN-REJECTED ACTINIDE IN AIR SPECTROSCOPY

CROSS REFERENCE TO RELATED APPLICATIONS

The present application is a U.S. non-provisional application which claims the benefit of U.S. provisional application Ser. No. 63/301,125, filed Jan. 20, 2022, the content of which is incorporated by reference herein in its entirety.

GOVERNMENT SUPPORT CLAUSE

This invention was made with government support under DE-AC09-08SR22470 awarded by the Department of Energy. The government has certain rights in the invention.

FIELD

The disclosure generally relates to detection applications and, more particularly, to systems and methods for detecting radioactive particles.

INTRODUCTION

This section provides background information related to the present disclosure which is not necessarily prior art.

A well-known challenge has existed for over 40 years in the nuclear industry with regard to monitoring of alpha-emitting actinides (e.g., Pu-239 and Am-241) in air—due mainly to the relatively 1,000× higher health impact on to workers, when compared with the simultaneous effects of omnipresent Rn-progeny alpha emitters also in air at ~1,000× higher concentrations. Such monitoring is conducted in the industry [e.g., at U.S. Department of Energy (USDOE) sites] using Continuous Air Monitors (CAMs) which strive to capture and decipher for the actinide alpha-emitting radionuclide aerosols on a filter that is positioned (typically) next to a passivated implanted planar silicon (PIPS) detector.

Actinide and Rn progeny aerosols (in Pu and U processing plants) may range in size from <1 μm to over 10 μm. Rn-progeny are generated as condensed state atoms during decay of Rn gas in the sub-nanometer range but they agglomerate and bond to dust particles. Actinide aerosols in air can result from machining or other liquid-air handling situations. From a health concern perspective, aerosol sizes in the 2-5 μm are of upmost importance because finer aerosols do not lodge into lungs and larger sizes quickly settle out of air. Unlike collecting Rn gas via sparging, aerosols do not dissolve into the CMTFD's sensing fluid.

Existing CAMs (e.g., Alpha-Sentry™) collect and examine for pertinent alpha particle radiation signals [indicative of the presence of specific actinides like Pu-239 using PIPS type detectors and peak shape fitting (PSF)] from entrained aerosols-in-air collected onto filters in a flowing air-stream. One metric for determining a threshold of acceptance is the annual limit on air intake (ALI)—which is a regulatory limit that quantifies the maximum amount of inhaled alpha-emitting radionuclides by an adult reference worker. ALI for actinides like Pu-239 is ~103× lower than for Rn-progeny (e.g., Po-218). Due to the omnipresence of Rn-progeny in air and the overlap of alpha energies between Rn-progeny and actinides, existing CAMs can lead to false-positive alarm signals. In this instance, the CAM filter may require further assessments that could take several days and resort to expensive mass spectroscopy based analyses. It would be valuable to rapidly (within hours) assess the CAM filter (that had alarmed) rapidly to ascertain if indeed the alarm was due to actinides.

The importance of such timely detection of ultra-trace levels of actinides in air, and their impact on health to humans is exemplified by consideration of the so-called annual limit on air intake (ALI)—which is a regulatory limit that quantifies the maximum amount of inhaled alpha-emitting radionuclides by an adult reference worker. An associated metric is the derived air concentration (DAC) which quantifies the amount of the radionuclide in air that, if inhaled for 2,000 hours under an assumed average breathing rate of 1.2 m$^3$/h will result in 1 ALI of radiation intake. Also, commonly used in the field is the DAC-h notation (used for setting CAM alarm limits), which is the product of the DAC quantity multiplied by the exposure time in hours. The relative impact of various alpha-emitting radionuclides is illustrated in Table 1.

TABLE 1

ALI and DAC levels for various nuclides of Interest

| Radionuclide | Half-life | ALI-Bq (μCi) | DAC-Bq/m$^3$ (μCi/mL) |
|---|---|---|---|
| Rn-222 (and progeny) | 3.82 d | 3.7 × 10$^6$ (100) | 1.13 (3 × 10$^{-8}$) |
| Pu-238 | 87.7 y | 7.4 × 10$^2$ (0.02) | 2.96 × 10$^{-4}$ (8 × 10$^{-12}$) |
| Pu-239 | 24,110 y | 7.4 × 10$^2$ (0.02) | 2.59 × 10$^{-4}$ (7 × 10$^{-12}$) |
| Am-241 | 432 y | 2.22 × 10$^2$ (0.006) | 1.11 × 10$^{-4}$ (3 × 10$^{-12}$) |
| U-234 | 245.5 y | 1.48 × 10$^3$ (0.04) | 7.4 × 10$^{-4}$ (2 × 10$^{-11}$) |
| U-238 | 4.5 × 10$^9$ y | 1.48 × 10$^3$ (0.04) | 7.4 × 10$^{-4}$ (2 × 10$^{-13}$) |

As readily noted from Table 1, the ALI and DAC levels for Rn-progeny in air are over 1,000× higher than that for actinides (isotopes of U, Am, Pu). Consequently, this implies that the allowable actinide levels in air for the actinide aerosols must remain 1,000× lower than that for Rn-progeny. It is noteworthy that due mainly to the high linear energy transfer (LET) of alpha radiation, Rn and progeny in air at >111 Bq/m$^3$ (3 pCi/L) in air in homes causes over 21,000 lung cancer deaths per year in the U.S. (per U.S.EPA). Detecting Rn-progeny in air at ~10$^2$ Bq/m$^3$ (pCi/L) concentrations is a challenge in itself which we have previously overcome. The challenge for monitoring of actinides in air at 1,000× lower activity concentration is made even greater due primarily to the overlap in energy of the alpha particles from actinide decay with that from Rn-progeny (Po-214 & Po-218) decay. This well-known challenge is illustrated schematically in FIG. 1.

Existing CAMs, such as the ALPHA-SENTRY™ commercially available from Mirion Technologies, Inc., collect and examine for pertinent alpha particle radiation signals [indicative of the presence of specific actinides like Pu-239 using PIPS type detectors and peak shape fitting (PSF)] from entrained aerosols-in-air collected onto filters in a flowing air-stream. ALI for actinides like Pu-239 is ~103× lower than for Rn-progeny (e.g., Po-218). Due to the omnipresence of Rn-progeny in air and the overlap of alpha energies between Rn-progeny and actinides, existing CAMs can lead to false-positive alarm signals. In this instance, the CAM filter may require further assessments that could take several days and resort to expensive mass spectroscopy based analyses. These known CAMs aim to capture up to ~90% of the Po radionuclides if in a clean laboratory environment by the utilizing the aforementioned filters and the use of algorithms that are based on so-called "peak-shape-fitting (PSF). Even with up to 90% Rn-progeny rejection (under the best of circumstances), the interference background can still be substantial (e.g., 100× versus ~1,000×). Such a challenge along with less than ideal alpha detection efficiency can lead to impractically long counting times, besides the broadening of the alpha energy lines due to interference of air and humidity-dust conditions; this may lead to substantial delays associated with allowing the relatively short-lived Rn-progeny to decay sufficiently over several days and worker idling; additionally, to resort to requiring expensive bioassays of workers or to transmit to specialized laboratories for mass spectrometry or other similar methods.

Accordingly, there is a continuing need for a method that separates Rn-progeny alpha emitting isotopes, while extracting actinides. Desirably, the method may enable enhanced Rn-progeny rejection while also efficiently detecting the extracted actinides that are transferred into an α-centrifugally tensioned metastable fluid detector (CTMFD). For instance, it would be valuable to rapidly (within hours) assess the CAM filter (that had alarmed) to ascertain if indeed the alarm was due to actinides.

SUMMARY

In concordance with the instant disclosure, a method that separates Rn-progeny alpha emitting isotopes, while extracting actinides, has been surprisingly discovered. Desirably, the method may enable enhanced Rn-progeny rejection while also efficiently detecting the extracted actinides that are transferred into an α-CTMFD.

The method of separating an actinide within a mixture of at least one Rn-progeny alpha emitting isotope may include a step of providing a continuous air monitoring filter. Next, the method may include a step of disposing the continuous air monitoring filter in acetone. Afterwards, the acetone may be evaporated, thereby forming a residue. The residue may be mixed with a first solution including nitric acid, thus forming a first blend. Then, the first blend may be mixed with a second solution including an extraction solvent, thus forming a second blend. The second blend may be stratified into a first layer and a second layer. The first layer may be extracted from the second blend, thus separating the actinide from the at least one Rn-progeny alpha emitting isotope. It should be appreciated the order of the steps of the method may be rearranged as desired.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
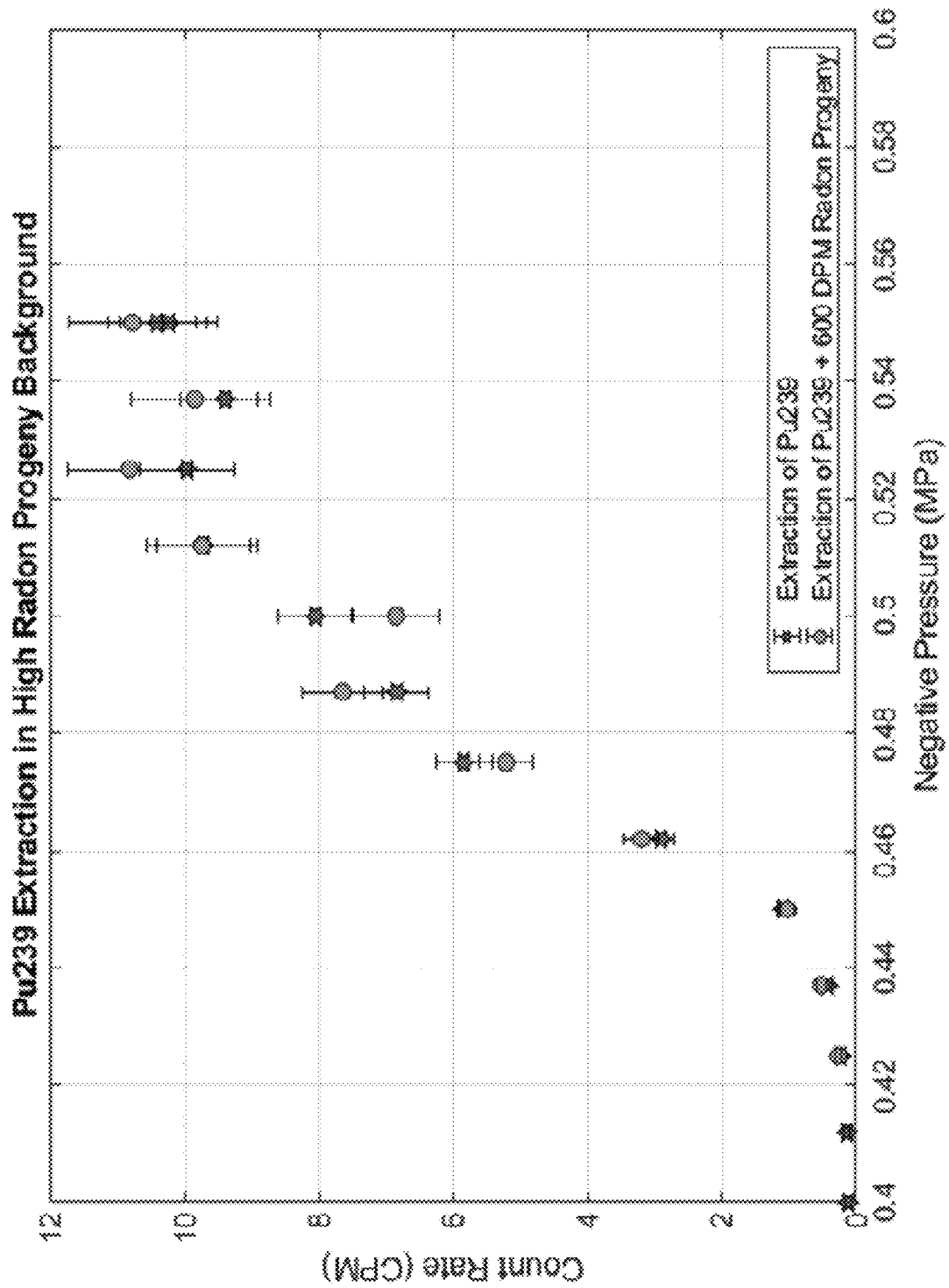
Figure 9:
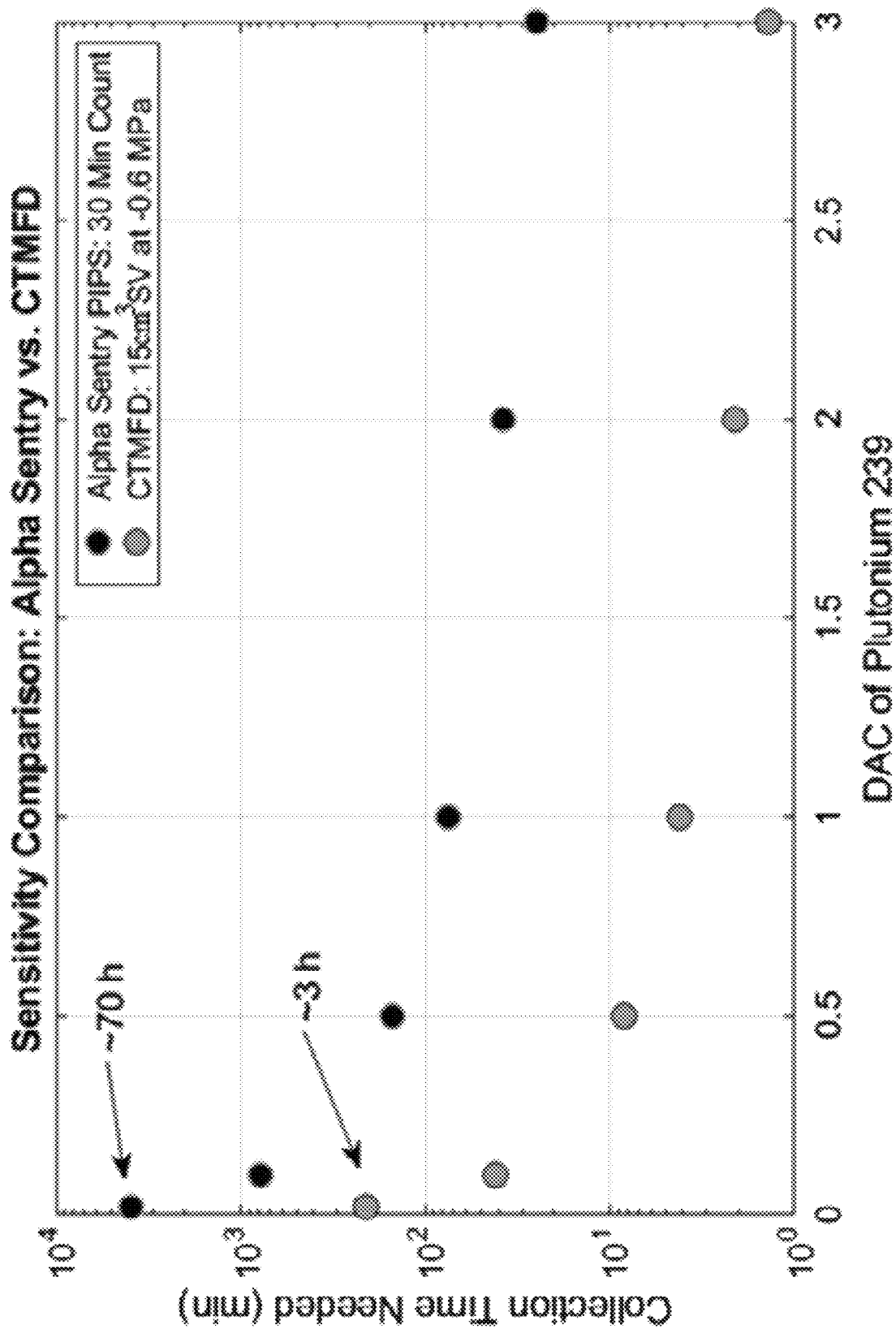

FIG. 8 is a plot diagram illustrating the results of an organic phase extract testing for 100% Rn-progeny rejected Pu-239 activity, according to one embodiment of the present disclosure; and FIG. 9 is a plot diagram illustrating a comparison of detection sensitivities for a known detection system (ALPHA SENTRY™ PIPS) versus the method of the present disclosure (α-CTMFD), according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
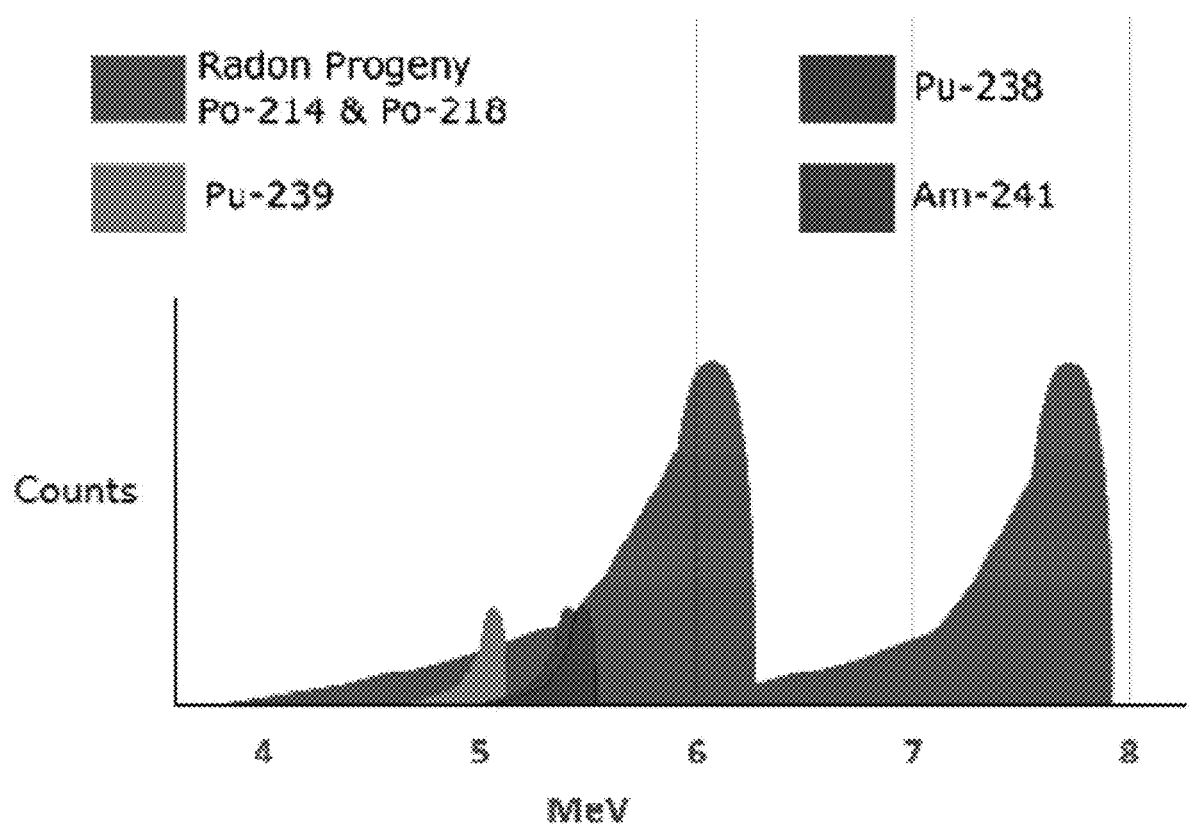
FIG. 1 is a schematic histogram provided as "prior art" illustrating counts in known PIPS-detector based continuous air monitors (CAM) versus alpha energy (in MeV), further depicting an overlap of detector counts from Po-214 and Po-218 decay over actinide alpha counts.
Figure 2:
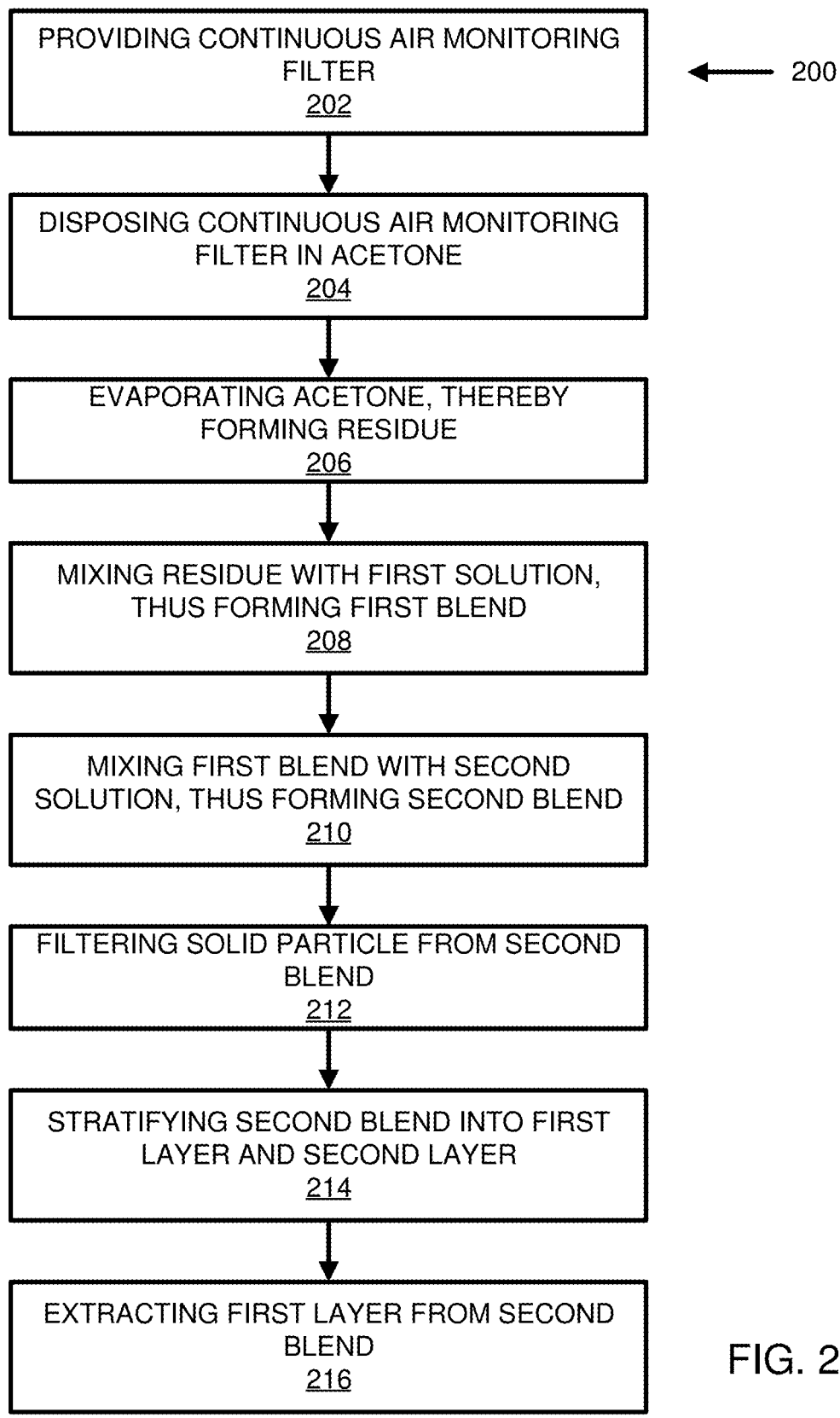
FIG. 2 is a method for separating an actinide within a mixture of at least one Rn-progeny alpha emitting isotope, according to one embodiment of the present disclosure.

Unless otherwise defined in the detailed description, the following acronyms may be understood as:

AARST-NRPP DEP=American Association of Radon Scientists and Technicians National Radon Proficiency Program Device Evaluation Program
ALI=annual limit of intake, µCi
ATMED: Acoustically Tensioned Metastable Fluid Detector
Avg=averaged
CAM=continuous air monitor
CPM=counts per minute
CTMFD=centrifugally tensioned metastable fluid detector
DAC=derived air concentration
DFP=decaflouropentane
DPM=disintegrations per minute
DOE=Department of Energy
EPA=Environmental Protection Agency
f=rotational frequency
$HNO_3$=nitric acid
LPM=liters per minute
NIST=National Institute of Standards and Technology
TBP=tri-butyl phosphate
TMED=tensioned metastable fluid detectors
PIPS=passivated implanted planar silicon
PSF=peak shape fitting
$P_{amb}$=ambient pressure
$P_{neg}$=negative pressure, Pa; $(2\pi^2 \rho r^2 f^2 - P_{amb})$
SV=sensitive volume
$\rho$=fluid density
r=fluid meniscus separation
$\sigma$=standard deviation As shown in FIG. 2, the method 200 of separating an actinide 102 within a mixture of at least one Rn-progeny alpha emitting isotope 104 may include a step 202 of providing a continuous air monitoring filter 106. Next, the method 200 may include a step 204 of disposing the continuous air monitoring filter 106 in acetone. Afterwards, the acetone may be evaporated, thereby forming a residue. The residue may be mixed with a first solution 108 including nitric acid, thus forming a first blend. Then, the first blend may be mixed with a second solution 110 including an extraction solvent, thus forming a second blend. The second blend may be stratified into a first layer 112 and a second layer 114. In a specific example, the first layer 112 may include the tributyl phosphate and the actinide 102, and the first layer 112 may be characterized by the absence of the Rn-progeny alpha emitting isotope 104. The first layer 112 may be extracted from the second blend, thus separating the actinide 102 from the at least one Rn-progeny alpha emitting isotope 104. In a specific example, the first layer 112 may be extracted from the second blend utilizing gravimetric extraction. In certain circumstances, the method 200 may also include a step 212 of filtering a solid particle from the second blend after the step 212 of mixing the first blend with the second solution 110, but before the step 214 of stratifying the second blend into a first layer 112 and a second layer 114. In a specific example, the method 200 may enable an Rn-progeny alpha emitting isotope 104 extraction efficiency greater than ninety percent. In a more specific example, the method 200 may enable an Rn-progeny alpha emitting isotope 104 extraction efficiency greater than around ninety five percent. In an even more specific example, the method 200 may enable an Rn-progeny alpha emitting isotope 104 extraction efficiency greater than around ninety eight percent. In a most specific example, the method may enable an Rn-progeny alpha emitting isotope 104 extraction efficiency of around one hundred percent. It should be appreciated the order of the steps of the method 200 may be rearranged as desired, within the scope of the present disclosure.

The first solution 108 may be provided with various concentrations. For instance, the nitric acid may have a molarity around 0.1M, 6M, or 15M. Advantageously, as a non-limiting example, where 6M nitric acid was utilized as the first solution 108 with TBP provided as the second solution 110, an Rn-progeny alpha emitting isotope 104 extraction efficiency of around one hundred percent was obtained for Uranium (U) and Plutonium (Pu) isotopes 104.

The first solution 108 may be provided with various materials and concentrations. For instance, the extraction solvent may include tributyl phosphate (TBP). In a more specific example, the extraction solvent may be provided with TBP and diisopropyl fluorophosphate (DFP). Desirably, DFP may be provided as a sensing fluid for centrifugally tensioned metastable fluid detector (CTMFD) analysis. In an alternative example, the extraction solvent may include di(2-ethylhexyl) phosphoric acid (HDEHP). Advantageously, as a non-limiting example, it was found that where the first solution 108 was provided as 0.1M nitric acid, and the second solution 110 was provided as HDEHP, an Rn-progeny alpha emitting isotope 104 extraction efficiency of around one hundred percent was obtained for Americium (Am) isotopes 104.

In certain circumstances, the extraction solvent may include both HDEHP and methanol. For instance, the first solution 108 and the second solution 110 may have around a 7:2:5 weight percentage ratio of nitric acid, HDEHP, and methanol, respectively. In a more specific example, the molarity of the nitric acid may be around 15M. Advantageously, where the first solution 108 and the second solution 110 may have around a 7:2:5 weight percentage ratio of 15M nitric acid, HDEHP, and methanol, respectively, the Rn-progeny alpha emitting isotope 104 extraction efficiency for Pu isotopes 104 was also found to be around one hundred percent, as a non-limiting example.

In certain circumstances, the second solution 110 may have a greater weight percentage ratio of DFP than TBP. In a more specific example, the second solution 110 may have around a 2:1 weight percentage ratio of DFP and TBP, respectively. A skilled artisan may select other materials and/or weight percentage ratios to form either of the first solution 108 and the second solution 110, within the scope of the present disclosure.

The continuous air monitoring filter 106 may be provided with various materials and/or dimensions. For instance, the continuous air monitoring filter 106 may be a polycarbonate filter. The continuous air monitoring filter 106 may have a pore size less than 10 μm. In a more specific example, the continuous air monitoring filter 106 may have a pore size around 3 μm. One skilled in the art may select other suitable materials and/or dimensions for the continuous air monitoring filter 106, within the scope of the present disclosure.

Example

Figure 3:
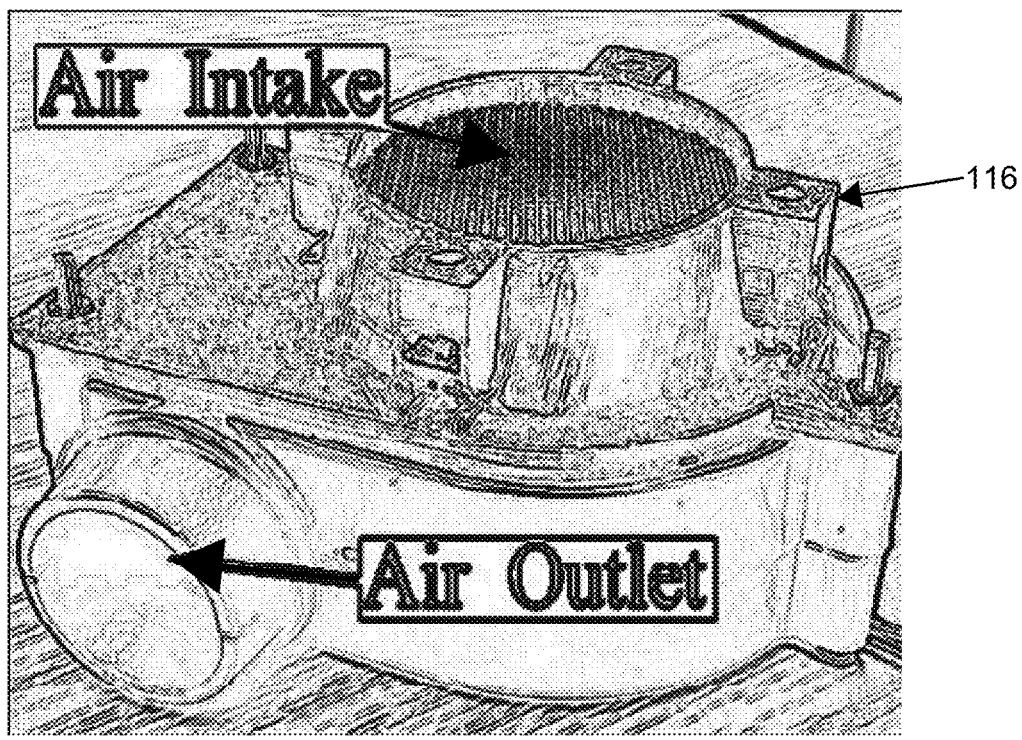
FIG. 3 is a front perspective view of a CAM system without a polycarbonate filter, according to one embodiment of the present disclosure.
Figure 4:
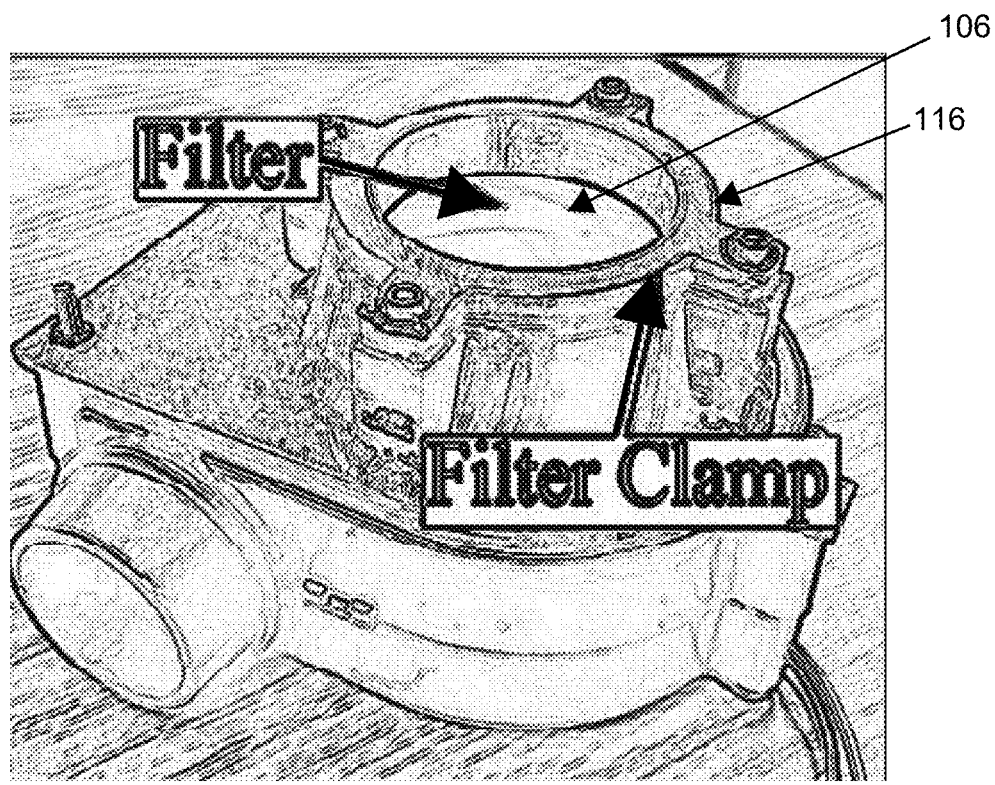
FIG. 4 is a front perspective view of the CAM system of FIG. 3, further depicting the CAM system with a polycarbonate filter, according to one embodiment of the present disclosure.
Figure 5:
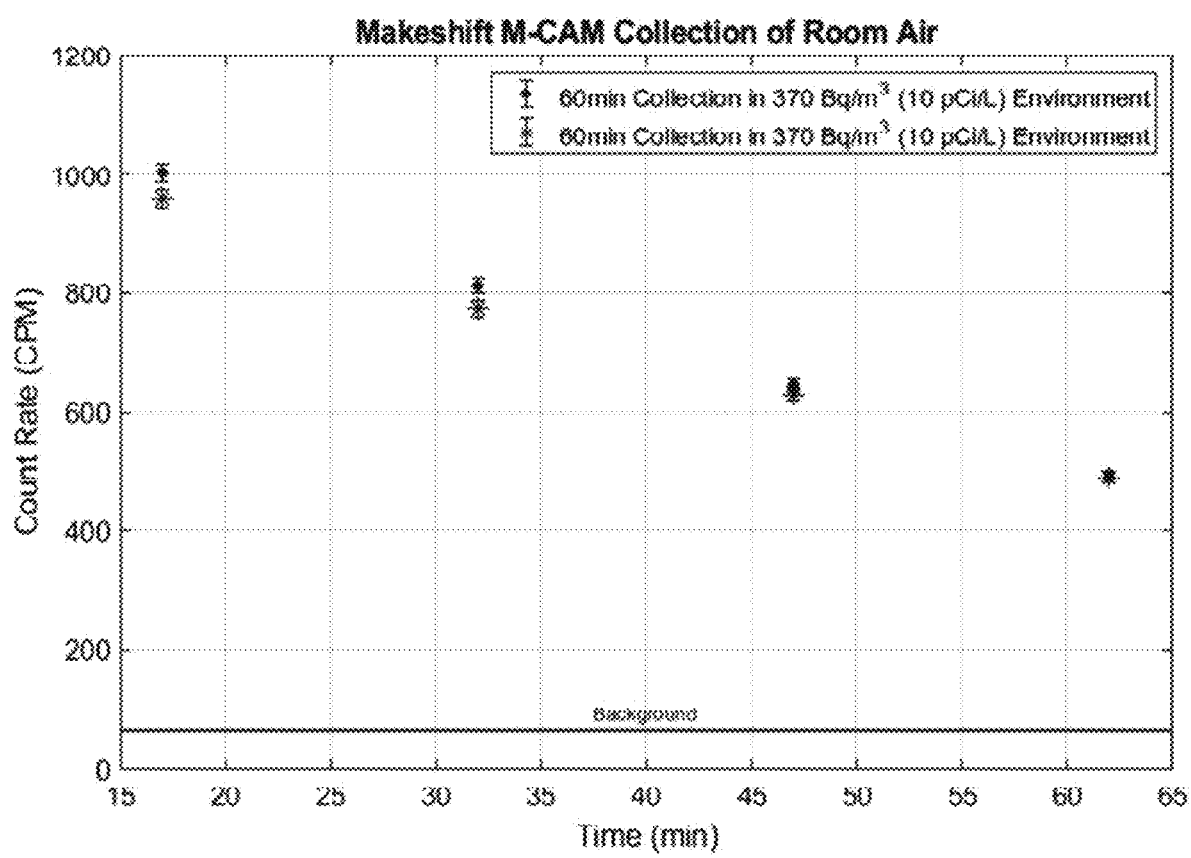
FIG. 5 is a plot diagram illustrating Rn-progeny collected on a CAM filter for count rate over time, according to one embodiment of the present disclosure.

Tests were conducted with a PYLON™ radon source, from Pylon Electronics, Inc., as well as by drawing room air for which we used to verify the presence of Rn at ~370 Bq/m$^3$ (10 pCi/L) concentration levels using the industry-standard method with a lucas cell. Results were obtained with room air passed through a modified CAM system 116, as shown in FIGS. 3-4, at 12 LPM flow rate for one hour. The CAM filter 106 was then tested for alpha activity by placing it in 15 mL of ULTIMA GOLD™ scintillation cocktail, commercially available from Signa Aldrich, and counting it in a Beckman LS6500™ liquid scintillation spectrometer. Results of wide window count rate (over 15 min. windows) vs time for two trials are shown in FIG. 5 indicative of Po-218 through Po-214 decays in equilibrium. With continued reference to FIG. 5, it is shown significant background Rn-progeny can be collected on to the filter 106. Thereafter this collection was assessed for the ability to selectively detect actinides like Pu-239 while rejecting the Rn-progeny.

The Rn-progeny bearing filter 106 was processed so that the collected progeny was separated (almost completely) in one stream while allowing actinides to be extracted into a different fluid stream. Desirably, once the actinide 102 bearing fluid stream is devoid of Rn-progeny it can be then confidently tested in the α-CTMFD for the presence of actinides 102.

Figure 6:
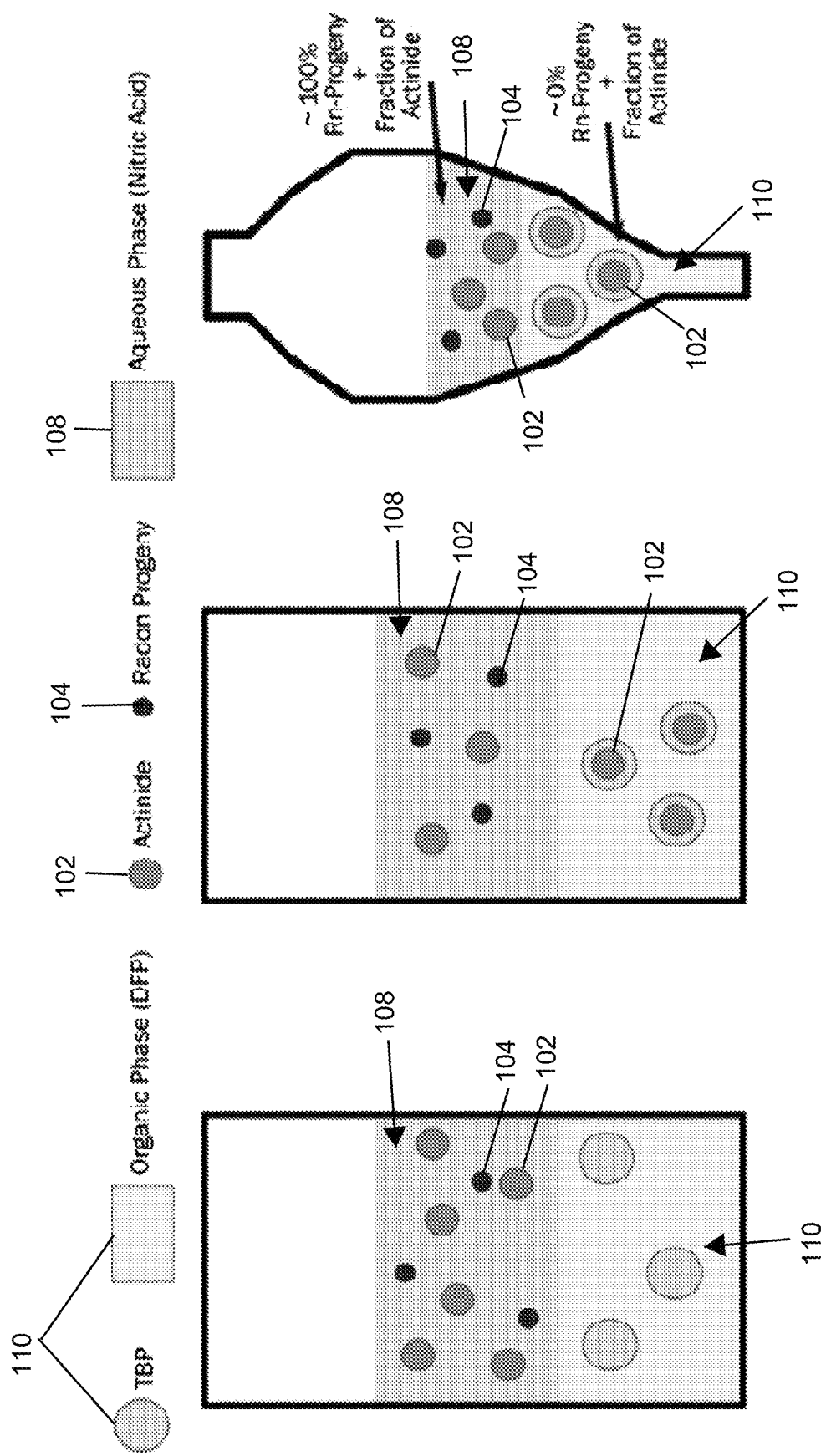
FIG. 6 is a schematic diagram of the stages for Rn-progeny separation from actinides, according to one embodiment of the present disclosure.

Provided as a non-limiting example, the method 200 was applied more specifically with the following steps. The CAM filter 106 was dissolved in 2 mL of acetone followed with evaporation, leaving a residue. Desirably, this step may help release Rn-progeny from pores while breaking down the polycarbonate matrix. Next, the first solution 108 having 6 mL of 15M HNO$_3$ (with or without actinide) may be added to the residue and stirred to enhance the mixing, thus forming the first blend. Afterwards, the second solution 110, having 4 mL of DFP and 2 mL of TBP of chemical formula $C_{12}H_{27}O_4P$, may be added to the first blend (6 mL residue bearing mixture), thus forming a second blend. The second blend may be mixed. Next, the second blend (12 mL mixture), may be filtered to remove solid residues. The second blend may then be stratified into the first layer 112 and the second layer 114, as shown in FIG. 6. From solubility considerations, TBP, which may act as an actinide extracting agent, accompanies the DFP and may separate from the aqueous HNO$_3$ bearing fluid stream. Lastly, the first layer 112 containing the DFP-TBP (with actinide 102) stream may be extracted for alpha activity detection and/or measurement.

Considering that the actinide 102 isotopic concentration is likely to be 1,000× lower than that for Rn-progeny, it is of utmost importance that virtually 100% of all Rn-progeny are absent from the extraction solvent stream.

In order to verify that the Rn-progeny collected onto the CAM filter 106 does not accompany the extraction solvent stream, the method 200 of separating an actinide 102 within a mixture of at least one Rn-progeny alpha emitting isotope 104 was executed first without the presence of any actinide 102.

Figure 7:
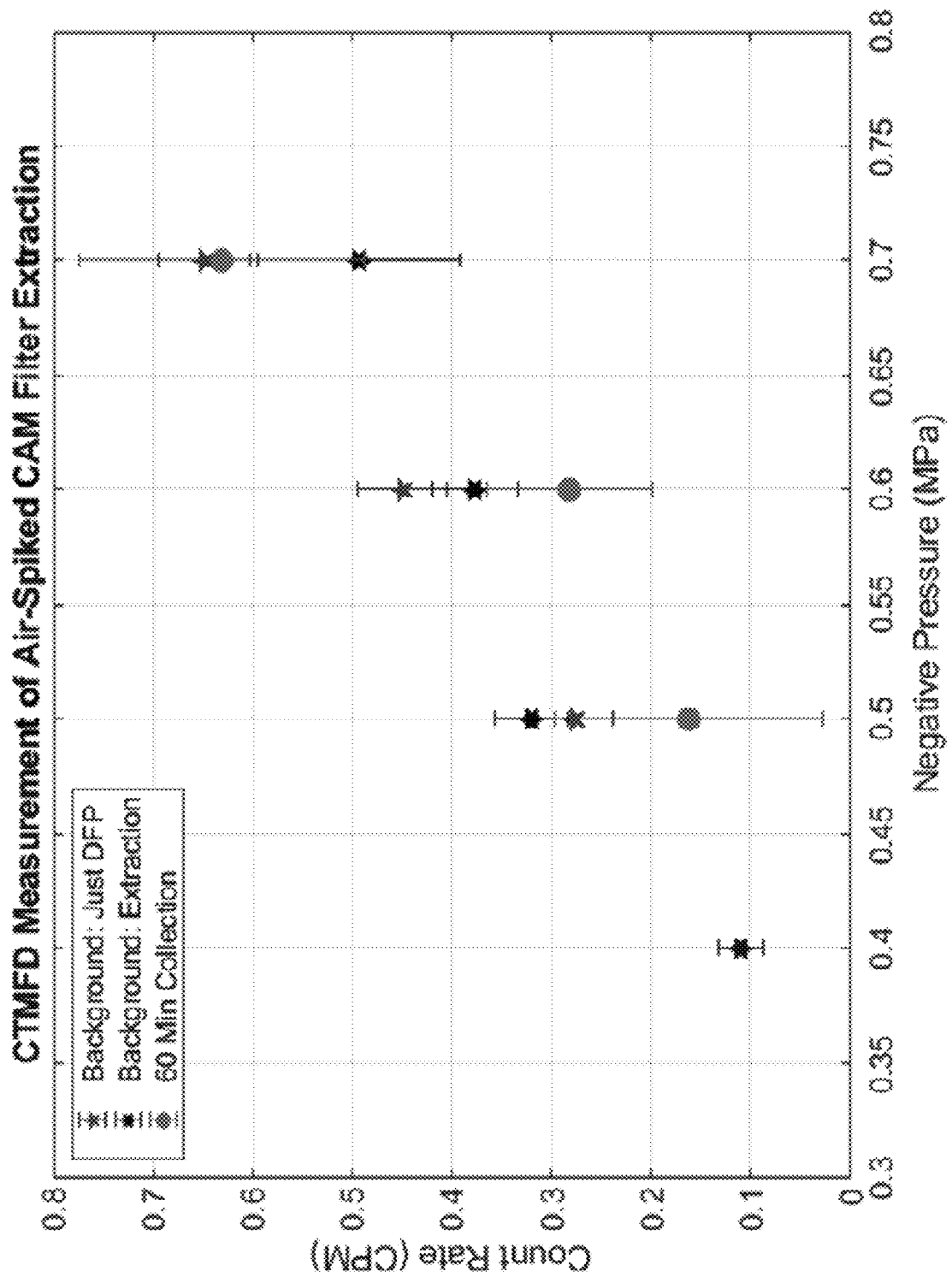
FIG. 7 is a plot diagram illustrating a room Rn-progeny air spiked experiment demonstrating Rn-progeny rejection, according to one embodiment of the present disclosure.

Room air (with ~370 Bq/m$^3$ (10 pCi/L) of Rn-progeny) was flowed into the CAM for one hour after which the method 200 was followed leading to a 6 mL DFP and TBP mixture. It was found that Rn-progeny could provide an alpha particle decay rate of ~1,000 CPM if all of it were to accompany the 6 mL DFP+TBP fluid volume. The 6 mL (DFP+TBP) volume of the method 200 was further mixed in with 94 mL of DFP resulting in 100 mL volume. This diluted mixture (with a potential 10 CPM/mL alpha activity) was then transferred into a 15 mL α-CTMFD and assessed for alpha activity. Results of 3 cases for the presence of Rn-progeny are depicted together in FIG. 7 which shows the variation of count rate (CPM) versus $P_{neg}$. The five-point star data represent detection rate for room background (mainly cosmic neutron activity). The circle data represent the results of testing the diluted DFP+TBP (after one hour of Rn-Progeny in air collection). Finally, the six-point star data represent the results of (but without any air flow over the CAM filter 106). As depicted in FIG. 7, all three databases show count rates that are within 2 standard deviations of each other—clearly indicating ~100% Rn-progeny rejection. Indeed, similar results were obtained even with much higher Rn-progeny collection on the CAM filter 106. These data provided confidence that the method 200 would at least reject ~100% of any Rn-progeny that may have been collected on to the CAM filter 106.

Having ensured for the absence of Rn-progeny it was also necessary to estimate how much of the specific actinide 102 (e.g., Pu-239, Pu-238, U, Am-241) will transfer into the organic DFP-TBP fluid stream. It was not possible to utilize air-bearing actinide streams flowing past the CAM filter 106. Instead, NIST-certified actinides 102 were used as available. For this project we had access to original Pu-239 and Pu-238 NIST-certified actinides 102 (dissolved in $HNO_3$).

The extraction efficiency was estimated using a single pass approach (i.e., not via multiple extractions with TBP). Results of following the method 200 approach starting with the actinide 102 in $HNO_3$ are shown in Table 2.

TABLE 2

Scoping study results of actinide solvent extraction (into DFP + TBP) efficiency

| Actinide | Stock source | Stock initial concentration | Amount of stock used | Expected concentration in 100 mL sample (Bq/mL) | Sample measured concentration (Bq/mL) | Extraction efficiency (%) |
|---|---|---|---|---|---|---|
| Pu-238 | NIST | 5.47 (Bq/mL) | 2 mL | 0.109 | 0.054 | ~49 |
| Pu-239 | NIST | 5.32 (Bq/mL) | 1 mL | 0.053 | 0.032 | ~61 |
| UN | IB1 Labs | 15.837 (Bq/g) | 0.0086 g | 1.362 | 0.838 | ~62 |
| Am-241 (sample-71) | NIST | 1.11 (Bq/mL) | 8 mL | 0.088 | 0.003 | ~4 |

As listed in Table 2, the extraction of NIST-supplied Pu-238 and Pu-239 (each in $HNO_3$) in a single pass manner resulted in an estimated extraction efficiency between 50-60%. The extraction efficiency of U (largely composed of U-238 alpha activity) is also estimated at ~60%. As was to be expected, for Am-241 the transfer efficiency using TBP is relatively low ~4%; in line with the well-known facts from over 50 years of experiences with the plutonium uranium reduction extraction (PUREX) process, that TBP is used for extracting tetravalent and hexavalent actinides but not trivalent Am, which travels to waste and does not significantly accompany Pu from the $HNO_3$-based feed solution. The small (~4%) recovery value for Am-241 we experienced is likely due to aqueous phase entrainment than from extraction.

The results of Pu and Am-241 actinide activity levels being processed were small (in the sub-Bq/mL range). The transfer processes involved using pipettes for small volumes of fluid streams. At this stage it was not deemed necessary to optimize the extraction efficiency. However, attempts were made to estimate the range of extraction efficiency for Pu-239 from trial to trial starting with the NIST-based diluted stock solution in $HNO_3$. Results are presented in Table 3 for four samples (A to D) prepared simultaneously from the same NIST-based Pu-239 diluted stock solution.

TABLE 3

Batch-to-batch variation of extraction efficiency for Pu-239

| Sample | Extraction# | Avg. CTMFD measured count rate (CPM) | Expected count mate based on NIST initial activity (CPM) | Extraction efficiency (%) |
|---|---|---|---|---|
| A | 1 | 5.56 ± 0.44 | 9.6 | 58 |
|   | 2 | 7.11 ± 0.70 | 9.6 | 74 |
| B | 1 | 8.66 ± 0.63 | 9.6 | 96.3 |
|   | 2 | 9.25 ± 0.82 | 9.6 | 96.3 |
| C | 1 | 9.64 ± 0.70 | 9.6 | 100.4 |
|   | 2 | 9.99 ± 0.91 | 9.6 | 104.1 |
| D | 1 | 5.99 ± 0.91 | 9.6 | 62.5 |
|   | 2 | 7.55 ± 0.96 | 9.6 | 78.61 |

As noted in Table 3, due principally to the relatively small volumes involved during dilution, transfers, and layer separation, and also possibly due to other thermodynamic and mixing dynamic factors the extraction efficiency was found to range from 58% towards above 104% (unrealistic-but within error). In retrospect, this may also be due to the fractional quantities of constituent fluids utilized. The density of a 6 mL organic fluid volume comprised of 4 mL DFP (density=~1,600 $kg/m^3$) and 2 mL TBP (density=~970 $kg/m^3$) is calculated to be ~1,390 $kg/m^3$. This is very close to the ~1,390 $kg/m^3$ density for the aqueous fluid volume comprising 15 Molar $HNO_3$. The relative migration of TBP between the aqueous and organic layers may well also account for variations in extraction efficiencies from batch to batch, which may be investigated further for attaining improved and more consistent estimates of the actinide extraction efficiency. However, the current setup may confidently assess for the presence of actinides 102 within a factor of 2 which may still reject and remain ~100% blind to the 1,000× higher Rn-progeny background alpha intensity.

Using the method 200, stock solutions were prepared for Pu-239, Pu-238, Am-241 and UN for which the extracted activity was high enough to be able to measure and establish a baseline with the Beckman LS6500™ spectrometer. Thereafter, these stock solutions were diluted by mixing with DFP and then tested in the 15 $cm^3$ SV α-CTMFD. Results of measured versus expected activity are presented in Table 4.

TABLE 4

Measured and predicted actinide activity levels in 15 $cm^3$ SV α-CTMFD

| Actinide (dilution factor) | Predicted activity (CPM) | Measured activity (CPM) |
|---|---|---|
| UN (10×) | 3.72 ± 0.19 | 4.13 ± 0.29 |
| Pu-239 (5×) | 5.83 ± 0.29 | 6.25 ± 0.44 |

TABLE 4-continued

Measured and predicted actinide activity levels in 15 cm³ SV α-CTMFD

| Actinide (dilution factor) | Predicted activity (CPM) | Measured activity (CPM) |
|---|---|---|
| Pu-238 (8×) | 2.18 ± 0.11 | 2.91 ± 0.21 |
| Am-241 (100×) | 3.18 ± 0.16 | 2.84 ± 0.2 |

As shown in Table 4, once the extraction is successfully conducted (i.e., removal of all Rn-progeny) and the amount of actinide activity in the stock solution is known, the stock can be utilized in diluted fashion with confidence to then conduct as needed future assessments for spectroscopy purposes in mixtures of various actinides 102.

We also find that the actually measured count rates for all of the four actinides 102 match well (within 2 SD error), with the predicted values from concentrated stock activity levels measured with the LS6500™ counter-indicating good linearity behavior with dilution. The $P_{neg}$ thresholds for each of the specimens also follows the energy of the dominant alpha recoil nuclei, ranging from P neg: −0.39 MPa (for Pu-238; Ea −5.51 MeV), −0.41 MPa (for Am-241, Ea −5.49 MeV), −0.44 MPa (for Pu-239, Ea −5.16 MeV), −0.45 MPa (for U-234, Ea-4.77 MeV), to −0.52 MPa (for U-238, Ea −4.2 MeV), respectively.

Having demonstrated in separate-effects fashion for Rn-progeny rejection and actinide extraction, spectroscopy tests were conducted to assess for simultaneous Rn-progeny rejected actinide extraction and detection. A 12 mL actinide bearing sample was created using 11.6 mL of 15M $HNO_3$ and 0.4 mL of Pu-239 NIST-based stock solution. These proportions were selected to allow for 6 mL of the actinide bearing solution to be used for extraction into the organic phase without Rn-progeny. This may then provide a baseline to compare against the next case wherein Rn-progeny would be included into the other 6 mL prior to extraction into the organic phase. 0.4 mL of Pu-239 stock (5.32 Bq/mL) constituting ~2.13 Bq of Pu-239 activity was added to the 11.6 mL of 15 Molar $HNO_3$. If the actinide 102 were extracted with 100% efficiency and used as before for testing in the 15 cm³ α-CTMFD, it should have resulted in a ~9.6 CPM count rate.

In certain circumstances, the CAM filter 106 was utilized directly without collecting Rn-progeny, and the Rn-progeny were collected on the filter 106 in a separate circumstance (which offered a 600 DPM count rate when placed under an alpha particle calibrated proportional counter). This level of Rn-progeny was calculated to lead to ~90 CPM added count rate in the α-CTMFD (if it were retained in the actinide bearing organic phase). The subsequent steps were the same for both filter specimens (i.e., dissolution in acetone, then allowed to evaporate after which $HNO_3$ (with and without actinide) is added, then mixed with DFP, and allowed to stratify into the aqueous and organic fluid phases, respectively). The organic phase is then diluted as before and entered into the CTMFD for counting. Results of testing with the α-CTMFD for the organic phase fluids for both cases (i.e., with Pu-239 only, and with Pu-239+Rn-Progeny included prior to extraction) are shown in FIG. 8.

With continued reference to FIG. 8, the results of count rate for both cases reach to ~10 CPM at/around $P_{neg}$=0.55 MPa. If the Rn-progeny collected on the CAM filter 106 were not rejected, the α-CTMFD testing would result in a combined total of ~100 CPM (=9.6 CPM from Pu-239+~90 CPM from Rn-progeny). Accordingly, these results confirm detection for actinide activity with ~100% Rn-progeny rejection.

It was not feasible to procure and test side-by-side the α-CTMFD against a widely used actinide-monitoring CAM in the DOE infrastructure. However, connections were facilitated for gaining insights on already-tested performance of the ALPHA-SENTRY™, commercially available from Mirion Technologies, Inc., CAM which is utilized for actinide-in-air monitoring at SRNS.

Relative performance of α-CTMFD vs Alpha-Sentry were performed based on actual data from α-CTMFD against published technical data sheets (supplemented with inputs from two Mirion Technologies, Inc. staff). Results are presented in Table 5 and further illustrated in FIG. 9.

FIG. 9 graphically illustrates the performance improvements for the α-CTMFD system in terms of length of time required. That is, for how long a collection time would be needed to measure with specified accuracy at varying DAC levels for Pu-239 in air. It was assumed herein that the ALPHA-SENTRY™ was operating with a flow rate of 60 LPM, in a 4 pCi/L radon background, using a 30 minute count cycle. Conservatively, it was assumed that the α-CTMFD would operate with a 50% extraction efficiency and measured at $P_{neg}$ ~0.6 MPa (with a ~0.5 CPM background) using a 15 cm³ SV CTMFD.

Under these assumptions, the MDA values of Pu-239 for ALPHA-SENTRY™ and α-CTMFD are ~1 Bq, and ~0.056 Bq, respectively. Furthermore, at an often-deployed alarm setting of 0.02 DAC for Pu-239, the collection time needed would be ~3 hours for α-CTMFD, and ~70 hours (18× higher) for ALPHA-SENTRY™.

From Table 5 and FIG. 9, we conclude that the α-CTMFD technology potentially offers significant (e.g., 18× faster detection for presence of Pu actinides over 0.02 DAC) benefits in terms of performance and economics of operation in tandem with, and to assist in operations with the existing ALPHA-SENTRY™ CAM technology which is in place at various DOE sites. Also, to be noted is that α-CTMFD technology offers ~100% Rn-progeny blind actinide detection regardless of the atmosphere (dusty or clean) and in addition to spectroscopic identification of alpha-emitting radionuclides of actinides 102 as well as Rn and progeny.

TABLE 5

Comparison of technical performance of Alpha-Sentry versus α-CTMFD

| Parameter | Alpha-Sentry | α-CTMFD |
|---|---|---|
| Absolute alpha detection efficiency | 26-33% | ~95-99% [2] |
| Radon-progeny rejection | Overall; low to Up to 95% | ~100% |
| Laboratory clean air | <95% | ~100% |
| Dusty air environment | Unspecified | ~100% |
| Need for peak shape fitting? [16] | Yes | No |
| Measurement time for | ~70h (3 days) assuming | 3 h (18× less time) |

TABLE 5-continued

Comparison of technical performance of Alpha-Sentry versus α-CTMFD

| Parameter | Alpha-Sentry | α-CTMFD |
|---|---|---|
| Pu-239 at 0.02 DAC | 90 + % Rn-Progeny Rejection | |
| Alpha spectroscopy | PIPS detector based | Built-in via $P_{mg}$ control |
| Resolution | 400 keV | ~1.4 keV [2] |
| Time (estimated) | 1-2 weeks | <1 d |
| Gamma background blind | No | Yes (tested to 700 R/h) |
| Neutron detection ability | No | Yes |

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method of separating an actinide within a mixture of at least one Rn-progeny alpha emitting isotope, the method comprising the steps of:
   providing a continuous air monitoring filter;
   disposing the continuous air monitoring filter in acetone;
   evaporating the acetone, thereby forming a residue;
   mixing the residue with a first solution including nitric acid, thus forming a first blend;
   mixing the first blend with a second solution including an extraction solvent, thus forming a second blend;
   stratifying the second blend into a first layer and a second layer;
   extracting the first layer from the second blend, thus separating the actinide from the at least one Rn-proeny alpha emitting isotope.

2. The method of claim 1, wherein the extraction solvent includes tributyl phosphate.

3. The method of claim 2, wherein the extraction solvent also includes diisopropyl fluorophosphate.

4. The method of claim 1, further comprising a step of filtering a solid particle from the second blend after the step of mixing the residue with the first solution, but before the step of stratifying the second blend into a first layer and a second layer.

5. The method of claim 1, wherein the step of extracting the first layer from the second blend includes utilizing gravimetric extraction.

6. The method of claim 1, wherein the molarity of the nitric acid is around 0.1M.

7. The method of claim 1, wherein the molarity of the nitric acid is around 6M.

8. The method of claim 1, wherein the molarity of the nitric acid is around 15M.

9. The method of claim 3, wherein the second solution has a greater weight percentage ratio of diisopropyl fluorophosphate than tributyl phosphate.

10. The method of claim 9, wherein the second solution has around a 2:1 weight percentage ratio of diisopropyl fluorophosphate and tributyl phosphate, respectively.

11. The method of claim 1, wherein the continuous air monitoring filter is a polycarbonate filter.

12. The method of claim 11, wherein the continuous air monitoring filter has a pore size less than 10 μm.

13. The method of claim 12, wherein the continuous air monitoring filter has a pore size around 3 μm.

14. The method of claim 1, wherein the first layer includes the tributyl phosphate and the actinide, the first layer is characterized by the absence of the Rn-progeny alpha emitting isotope.

* * * * *